United States Patent [19]

Hopper, Jr.

[11] Patent Number: 4,552,468

[45] Date of Patent: Nov. 12, 1985

[54] BICYCLE SEALED BEARING KIT

[76] Inventor: Willard C. Hopper, Jr., 4850 Trail, Norco, Calif. 91760

[21] Appl. No.: 349,617

[22] Filed: Feb. 17, 1982

[51] Int. Cl.[4] .............................................. F16C 9/02
[52] U.S. Cl. .................................... 384/458; 384/540; 384/585
[58] Field of Search ................ 308/192, 190, 189 R, 308/179.5, 236, 216; 74/594.1, 594.2

[56] References Cited

U.S. PATENT DOCUMENTS

| | | | |
|---|---|---|---|
| 559,902 | 5/1896 | Marceau | 308/192 |
| 958,548 | 5/1910 | Sapp | 308/192 |
| 2,257,401 | 9/1941 | Schwinn | 308/179.5 |
| 3,301,614 | 1/1967 | Haentjens | 308/236 X |
| 4,358,967 | 11/1982 | Kastan | 308/192 X |

FOREIGN PATENT DOCUMENTS 899501 of 1945 France ................... 308/192

Primary Examiner—Stuart S. Levy
Assistant Examiner—David Werner
Attorney, Agent, or Firm—Harvey S. Hertz

[57] ABSTRACT

A bicycle sealed bearing kit is used to install sealed bearing units on a bicycle having a one-piece crank. The kit includes an inner race formed of a cylindrical collar having a flange formed at one end thereof. The flange is integrally formed with the collar and extends outwardly in a plane perpendicular to the collar. The inner race has threads on the inner surface thereof for enabling the inner race to be secured to the crank. The sealed bearing unit is mounted on the collar with one thereof juxtaposed with the flange of the inner race.

1 Claim, 2 Drawing Figures

BICYCLE SEALED BEARING KIT

BACKGROUND OF THE INVENTION (1) Field of the Invention

The field of arts which the invention pertains includes the field of bicycle wheel bearings, particularly, with respect to a bicycle sealed bearing unit which can be utilized to mount sealed bearings on a bicycle having a one-piece crank.

(2) Description of the Prior Art

Conventional bicycles utilizing a one-piece crank normally are formed with non-sealed bearings. Where sealed bearings are desirous, it has been found that custom modification kits must be made for each bicycle. In U.S. patent application Ser. No. 227,642 filed Jan. 23, 1981 there is described a sealed bearing unit for bicycles having multi-piece cranks. In such a bicycle design, the bearings used in the bicycle hub are removed and the bearing collar unit is machined to form fit in the wheel hub. Such a technique enables bicycles not having sealed bearing units to incorporate the sealed bearing units therein.

The present invention utilizes a sealed bearing kit for installing sealed bearing units on a bicycle having a one-piece crank. The sealed bearing unit is easily installed by removing the non-sealed bearing units from the bicycle and utilizing a specially designed inner race which is used to secure the sealed bearing unit to the bicycle wheel hub.

SUMMARY OF THE INVENTION

A bicycle sealed bearing kit is used to install sealed bearing units on a bicycle having a one-piece crank. The kit includes an inner race formed of a cylindrical collar having a flange formed at one end thereof. The flange is integrally formed with the collar and extends outwardly in a plane perpendicular to the collar. The inner race has threads formed on the inner surface thereof for enabling the inner race to be secured to the crank. The sealed bearing unit is mounted on the collar and one end thereof is juxtaposed with the flange of the inner race.

The advantages of this invention both as to its construction and mode of operation will be readily appreciated as the same becomes better understood by reference to the following detailed description when considered in connection with the accompanying drawing in which like reference numerals designate like parts throughout the figures.

BRIEF DESCRIPTION OF THE DRAWINGS

FIG. 1 is a plan view in cross section, illustrating the mounting of the sealed bearing unit in a conventional bicycle wheel hub assembly having a one-piece crank passing there-through.

DESCRIPTION OF THE PREFERRED EMBODIMENT

Figure 1:
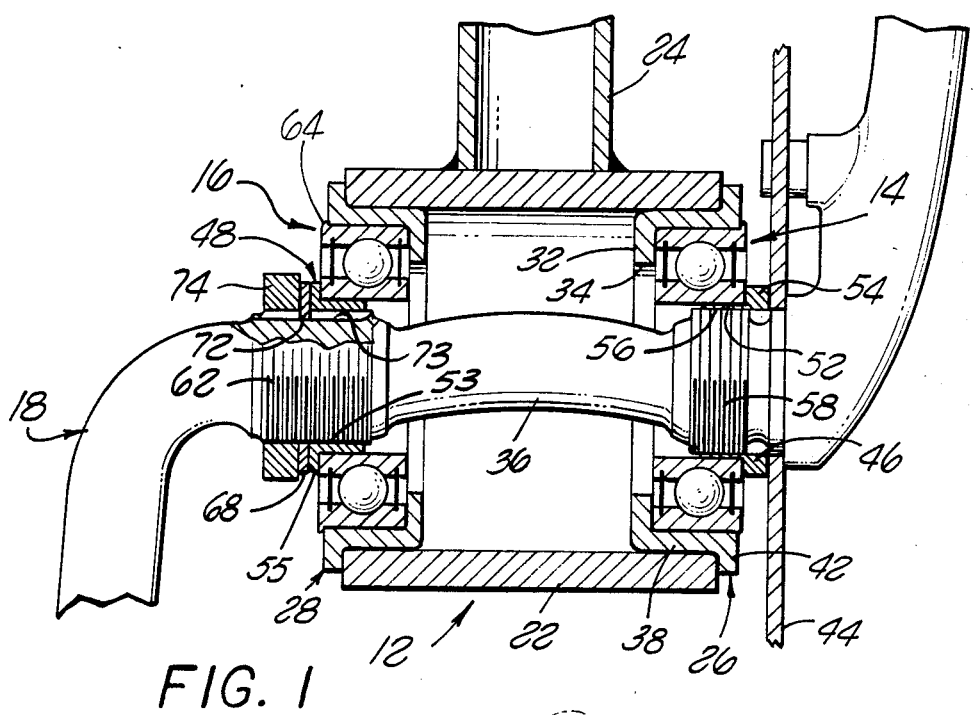

Referring now to the drawings, there is shown in FIG. 1 a bicycle wheel hub assembly 12 having a pair of sealed bearing units 14 and 16 mounted therein. The bicycle of the present invention includes a one-piece crank 18 which passes through the interior of the hub assembly 12.

The hub assembly 12 is of conventional design and includes a cylindrical sleeve 22. A bicycle support member 24 may be secured to the outer surface of the cylindrical sleeve 22 as by welding or other conventional techniques.

A pair of cup shaped members 26 and 28 normally form an integral part of the hub assembly. The right cup shaped member 26 extends into the interior of the hub assembly and its bottom wall 32 contains an aperture 34 through which the crank 18 axle passes. The cup shaped member sidewall 38 has its outer surface juxtaposed with the inner surface of the hub assembly cylindrical sleeve 22. A flange 42 of the cup shaped member 26 extends outwardly with its surface abutting the outer edge of the cylindrical sleeve 22.

Similarly, the left cup shaped member 28 is positioned at the other end of the hub assembly cylindrical sleeve in a mirror image configuration with the right cup shaped member 26. Normally, the cup shaped members 26 and 28 may be secured to the cylindrical sleeve 22 at the juxtaposed adjacent surfaces by welding or other securing techniques so as to form an integral part of the hub assembly 22.

The one-piece crank 18 is of conventional design with its arms typically connected to bicycle pedals (not shown) which are utilized to drive the bicycle chain sprocket 44.

Inner races 46 and 48 are utilized to secure the sealed bearing units 14 and 16 within the cup shape members 26 and 28 respectively. The inner race 46 is formed of a cylindrical collar 52 having an integrally formed flange 54 at one end thereof. The flange 54 extends outwardly in a plane perpendicular to the collar axis. The interior surface of the collar 56 is threaded enabling the inner race 46 to be threadably secured to threaded surface 58 formed on the axle 36 of the one-piece crank 18. As will be explained hereinafter, the inner races 46 and 48 are threaded on to the one-piece crank 18 and are utilized to correctly position and hold the sealed bearing units 14 and 16 within the cup shape members 26 and 28 of the hub assembly, respectively.

The inner race 48 is similar to the inner race 46 but has a slightly smaller inner diameter in its threaded cylindrical collar 53. Typically, this smaller diameter is needed since the diameter of the threaded surface 58 is greater than the diameter of the axle threaded surface 62 to which the collar 53 of the inner race 48 is secured. This difference in axle diameter enables the inner race 46 to pass over the threaded surface 62 during assembly.

In addition, the flange 53 of inner race 46 is slightly thicker than the flange 55 of inner race 48 in order to assure better chain alignment for the chain (not shown) mounted on the sprocket 44.

Figure 2:
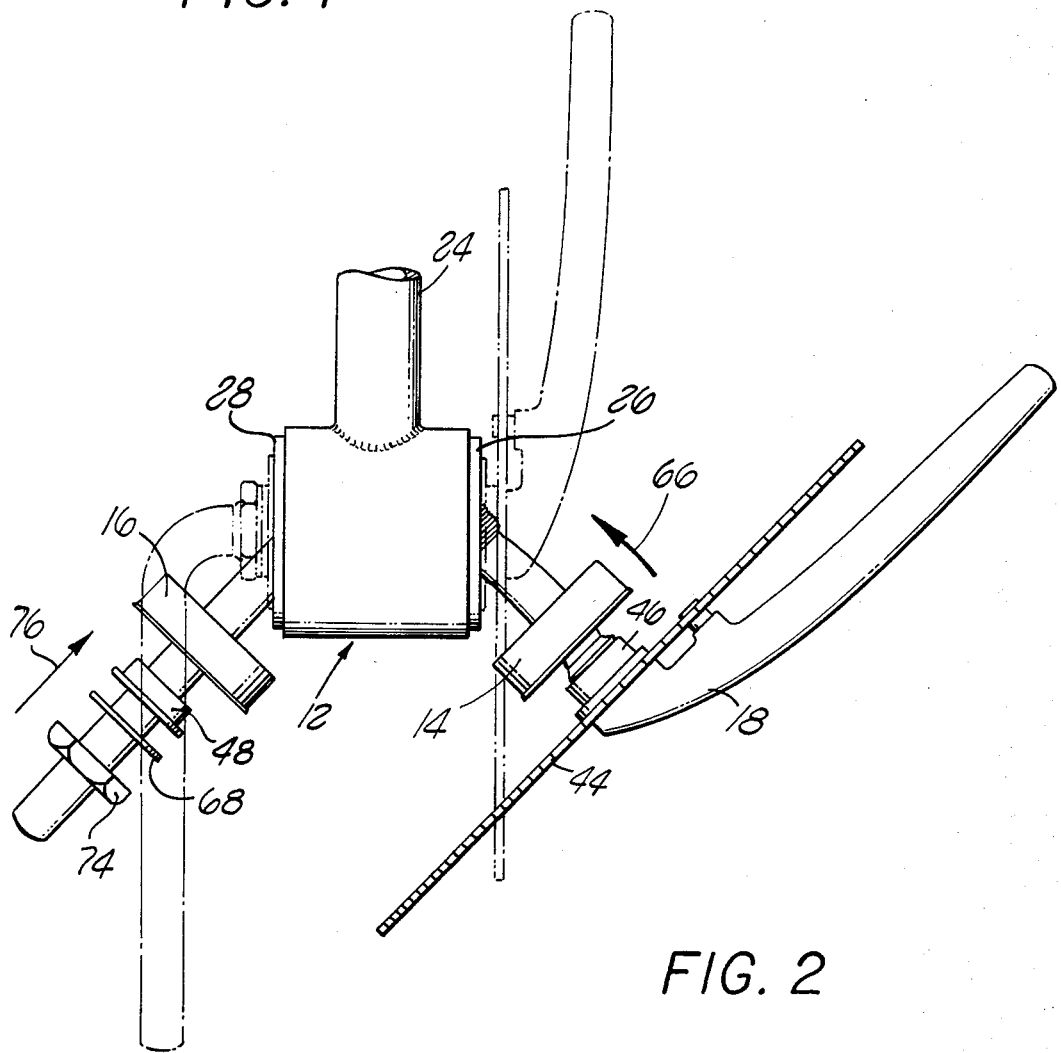
FIG. 2 is a plan view of the hub assembly of FIG. 1 explaining the method of installing the sealed bearing kit and the sealed bearings on the bicycle hub assembly.

Referring now to FIG. 2, there is illustrated the technique for installing the right and left sealed bearing units 14 and 16 respectively. With the one-piece crank 18 removed from the hub assembly, the right inner race 46 is positioned on the one-piece crank and threadably secured thereon until its flange 54 is adjacent to the sprocket 44. Then the right sealed bearing unit 14 is mounted on the one-piece crank. It should be noted that the sealed bearing unit contains a flange 64 which should be adjacent to the inner race flange 54.

Then the one-piece crank 18 is passed through the hub assembly 12 in the manner shown by the right arrow 66 of FIG. 2 until in a position shown by the non-solid lines. The right sealed bearing 14 is positioned in the right cup shaped member 26 and the collar 52 of the right inner race 46 positioned within the right sealed bearing 14.

Then the left bearing unit 16 is mounted on the crank 18 and positioned in the left cup shaped member 28. The left inner race 48 is threadably secured on the threads 62 of the one-piece crank 18. Then a keyed washer 68 is mounted adjacent the outer surface of the left inner race collar 53 with the key 72 extending into a slot 73 in the threaded surface 62 of the crank 18 so as prevent rotation of the washer. Finally, a lock nut 74 is tightened into place.

Typically, after the left inner race 48 is threaded so that its flange abuts the sealed bearing unit 16, it is recommended that the left inner race be backed off 1/16 of a turn so as to avoid undue pressure on the bearing unit.

To remove the sealed bearings and one-piece crank the process is reversed with the lock nut 74 initially removed and then the left inner race 48 removed. Then the crank 18 is removed from the hub assembly 12 in the direction shown by the arrow 76 and the right sealed bearing unit 14 gently tapped off of the right inner race 48.

It should be noted that the cup-shaped members 26 and 28 could easily be eliminated and the bearings mounted directly in the cylindrical sleeve 22 of the hub assembly. In such an arrangement, the bearing outer diameter would be increased and the bearing flange 64 would abut the end of the cylindrical sleeve 22.

I claim:

1. A bicycle sealed bearing unit kit for installing sealed bearing units on a bicycle having a one-piece crank comprising:

a pair of bearing mounting elements each formed of a cylindrical collar having a flange formed at one end thereof; said flange being integrally formed with said collar and extending outwardly in a plane perpendicular to said collar axis;

said bearing mounting elements each having threads formed on the inner surface thereof for enabling said elements to be secured to said crank and wherein a conventional sealed bearing unit is mounted on each of said collars, and wherein one end of each bearing unit is juxtaposed with one of said flanges of said element;

the inner diameter of one of said element collars being smaller than the inner diameter of the collar of said other element, for enabling the element collar having a greater diameter to pass over the portion of said crank to which said element collar having a smaller diameter is secured.

* * * * *